(12) United States Patent
Koyanagi

(10) Patent No.: US 6,937,410 B2
(45) Date of Patent: Aug. 30, 2005

(54) APPARATUS AND METHOD EMPLOYED IN DISK DRIVE TO ENABLE SINGLE SIGNAL LINE TO BE USED FOR TRANSMISSION OF BOTH READ AND CONTROL SIGNALS

(75) Inventor: Takahiro Koyanagi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 303 days.

(21) Appl. No.: 10/232,668

(22) Filed: Sep. 3, 2002

(65) Prior Publication Data

US 2003/0112540 A1 Jun. 19, 2003

(30) Foreign Application Priority Data

Dec. 17, 2001 (JP) ........................................ 2001-383378

(51) Int. Cl.[7] ................................................ G11B 5/09
(52) U.S. Cl. ..................................... 360/46; 360/77.08
(58) Field of Search .............................. 360/46, 77.08, 360/75, 51; 327/233

(56) References Cited

U.S. PATENT DOCUMENTS

| | | | |
|---|---|---|---|
| 5,373,403 A | | 12/1994 | Okamura et al. |
| 5,382,917 A | | 1/1995 | Miyake et al. |
| 5,422,760 A | * | 6/1995 | Abbott et al. .................. 360/46 |
| 5,754,354 A | | 5/1998 | Tomita et al. |
| 6,111,717 A | * | 8/2000 | Cloke et al. .................... 360/67 |
| 6,118,602 A | * | 9/2000 | de la Soujeole .............. 360/46 |
| 6,201,658 B1 | * | 3/2001 | Maki ............................ 360/75 |
| 6,519,104 B1 | * | 2/2003 | Cloke et al. ................... 360/51 |
| 6,611,167 B2 | * | 8/2003 | McMahon et al. ........... 327/538 |

FOREIGN PATENT DOCUMENTS

| | | |
|---|---|---|
| JP | 6-169227 | 6/1994 |
| JP | 2001-184619 | 7/2001 |

OTHER PUBLICATIONS

Austrian Search and Examination Reports, dated May 14, 2004 for Patent Application No. 200205055-7.

* cited by examiner

Primary Examiner—David Hudspeth
Assistant Examiner—K. Wong
(74) Attorney, Agent, or Firm—Pillsbury Winthrop Shaw Pittman, LLP

(57) ABSTRACT

A first amplifier which amplifiers a faint read signal read by a head is connected to a second amplifier which further amplifiers the read signal amplified by the first amplifier, via a signal line. The signal line is used to transmit the read signal from the first amplifier to the second amplifier, and also to transmit a control signal from the second amplifier to the first amplifier. On the basis of, for example, a point in time at which a servo mark is detected from servo data, a control unit sets a period of time in which the transmission of the control signal from the second amplifier to the first amplifier is permitted, so that it does not overlap a period of time in which the servo data is read.

14 Claims, 6 Drawing Sheets

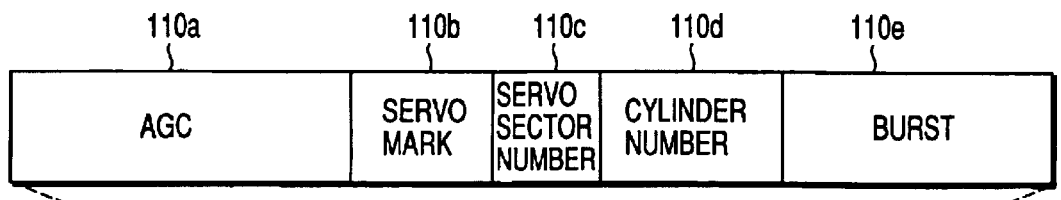
FIG. 2B
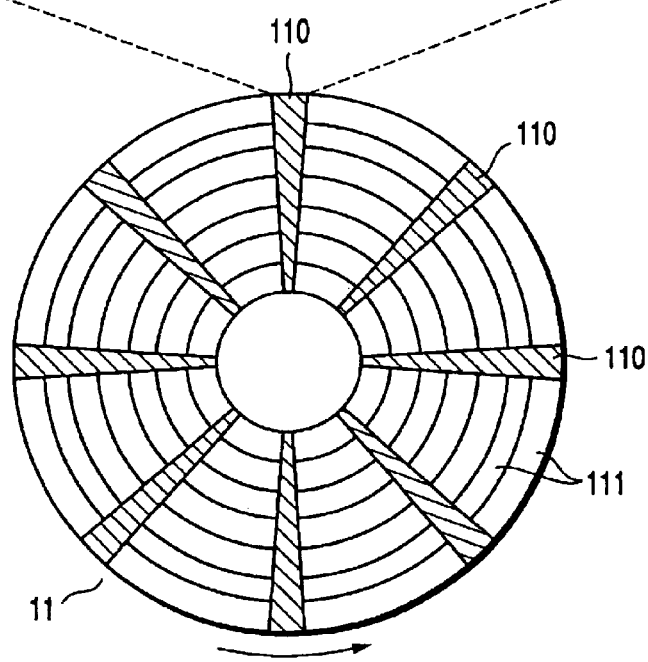
FIG. 2A   ROTATION DIRECTION OF DISK

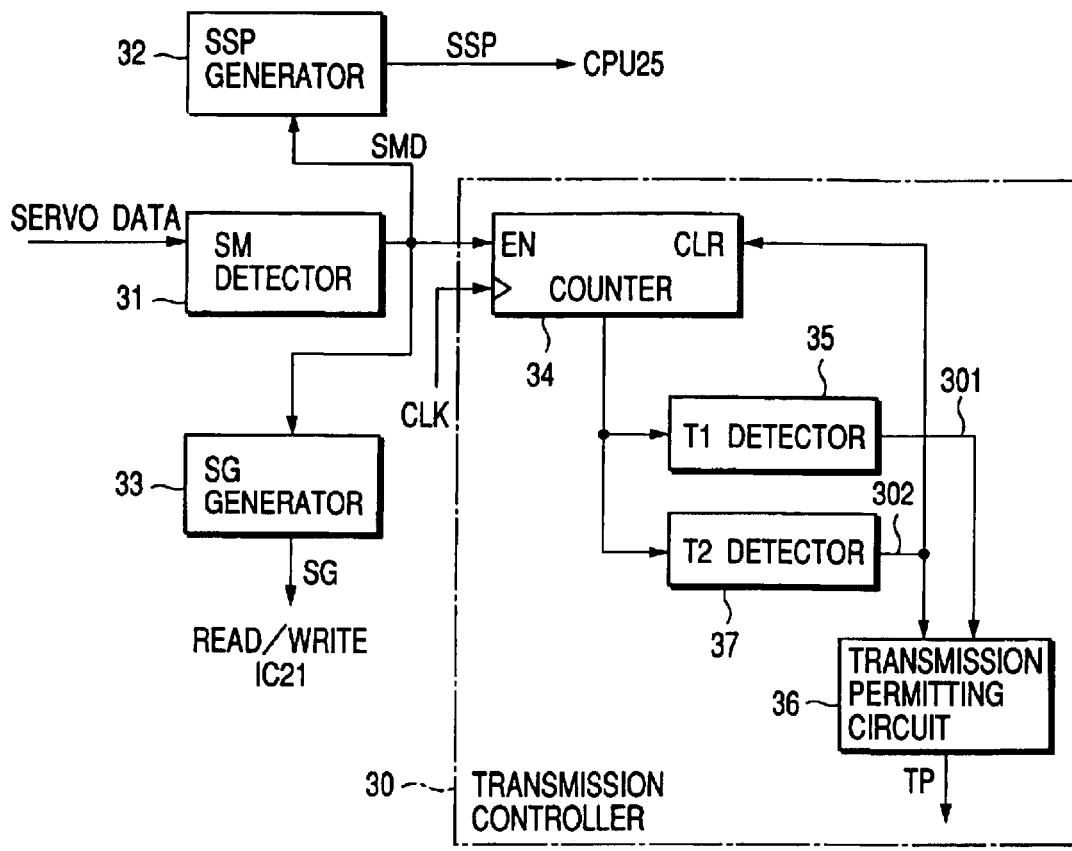
FIG. 3
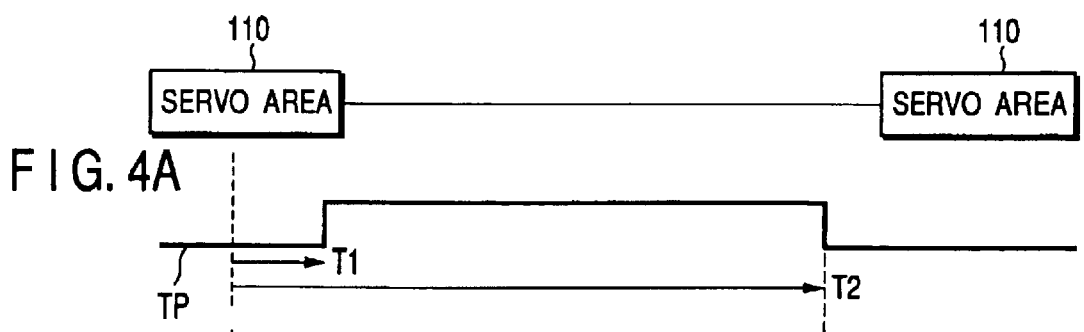
FIG. 4A
FIG. 4B
FIG. 4C

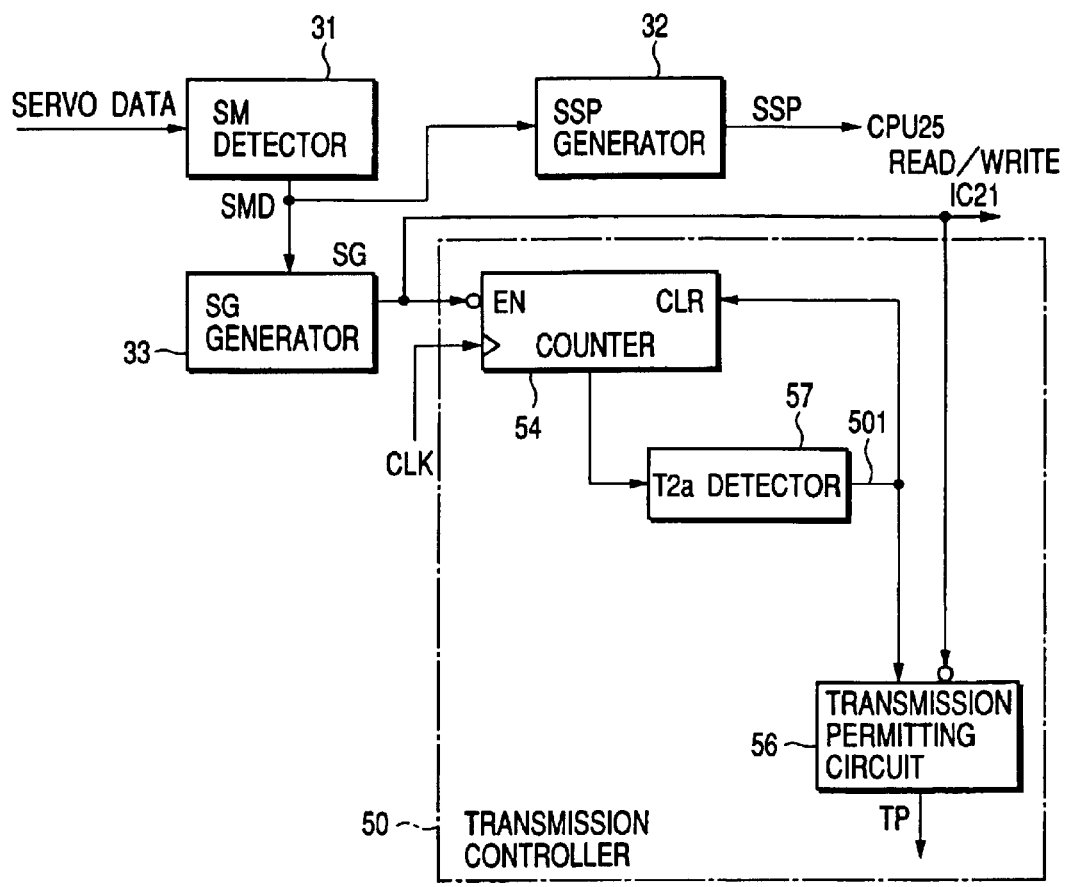
FIG. 5
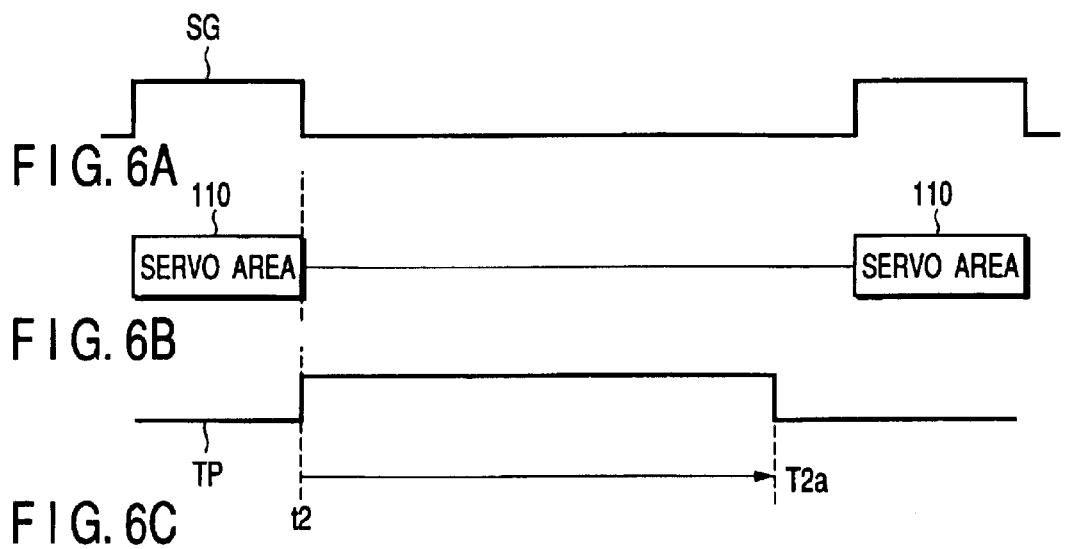
FIG. 6A
FIG. 6B
FIG. 6C

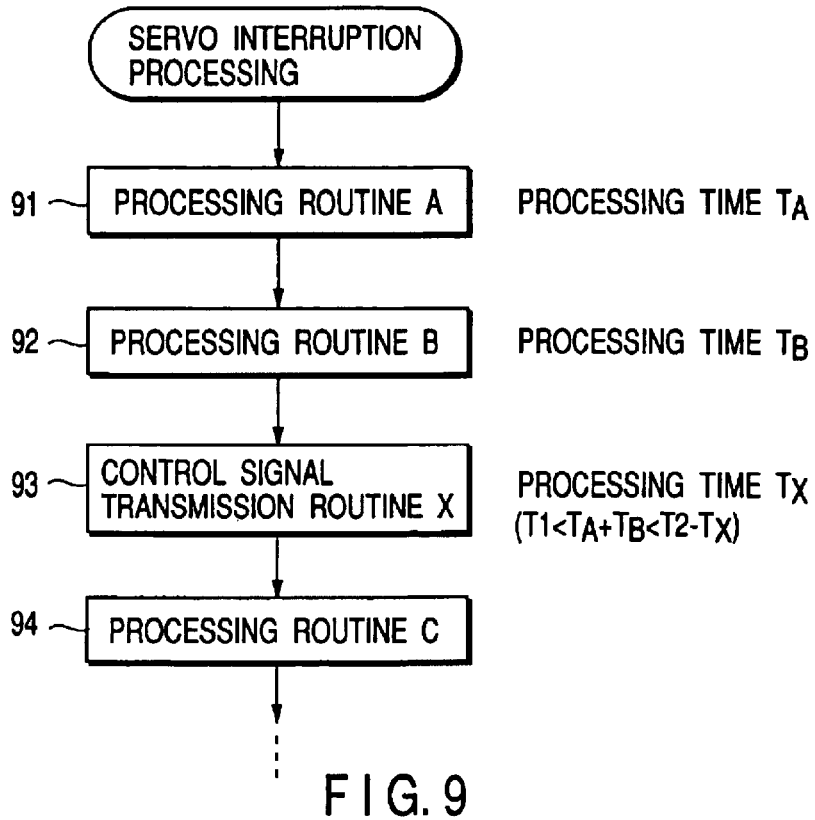
FIG. 9
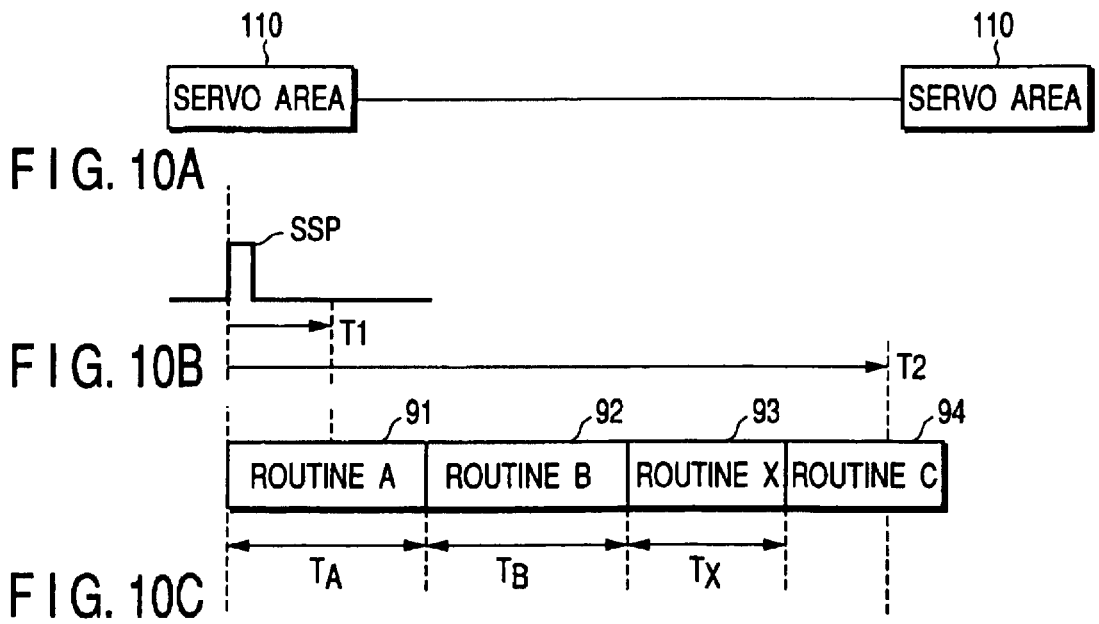
FIG. 10A
FIG. 10B
FIG. 10C

APPARATUS AND METHOD EMPLOYED IN DISK DRIVE TO ENABLE SINGLE SIGNAL LINE TO BE USED FOR TRANSMISSION OF BOTH READ AND CONTROL SIGNALS

CROSS-REFERENCE TO RELATED APPLICATIONS

This application is based upon and claims the benefit of priority from the prior Japanese Patent Application No. 2001-383378, filed Dec. 17, 2001, the entire contents of which are incorporated herein by reference.

BACKGROUND OF THE INVENTION

1. Field of the Invention

The present invention relates to a disk drive apparatus equipped with a first amplifier for amplifying a read signal read by a head from a disk medium, and a second amplifier for further amplifying the read signal amplified by the first amplifier, and more particularly to an apparatus and method for enabling a single signal line connecting the first and second amplifiers to be used for both the transmission of a read signal from the first amplifier to the second amplifier, and the transmission of a control signal from the second amplifier to the first amplifier.

2. Description of the Related Art

Hard disk drives (HDDs) are known as disk drive apparatuses for reading data recorded on disk mediums, using heads. In hard disk drives, data magnetically recorded on a magnetic disk (magnetic disk medium) is read (reproduced) by a magnetic head. As a result, a faint read signal is output from the head. This read signal is input to a head amplifier circuit in the form of an IC chip, i.e., a so-called head IC. The read signal input to the head IC is amplified by an amplifier (read amplifier) in the head IC, and then supplied to a read/write IC (read/write channel IC). The read/write IC detects and decodes data from the signal amplified by the amplifier.

In general, the head IC is mounted on an end of a flexible printed circuit board (FPC) that is in the form of a strip, the end being remote from the magnetic head and called a base portion. In this structure, the wiring (wiring pattern) between the magnetic head and head IC is inevitably long. This means that the wiring has a high inductance and capacitance. Accordingly, a faint read signal output from the magnetic head is significantly influenced by noise.

To avoid this, Japanese Patent Application KOKAI Publication No. 2001-184619, for example, has proposed a structure in which the head IC is mounted on the suspension that supports the magnetic head. In this structure, the wiring between the magnetic head and head IC can be shortened, and accordingly the inductance and capacitance of the wiring can be reduced. However, the mounting of the head IC on the suspension is not easy in light of the present head IC size.

Consequently, a method could be devised where a first amplifier for amplifying a faint read signal output from the magnetic head, and a second amplifier for further amplifying the read signal amplified by the first amplifier are used instead of the amplifier incorporated in the head IC, the first amplifier being separate from the head IC. In this new structure, the first amplifier can have a small size and hence can be mounted on a small area near the magnetic head, e.g. on the suspension or on a stationary portion of a carriage. Moreover, since a faint read signal read by the magnetic head is first amplified by the first amplifier near the head, and is then transmitted to the second amplifier, it is less influenced by noise, even if the wiring between the first and second amplifiers is relatively long.

In the prior structure, the control signal is transmitted to the amplifier in the head IC to control the head IC. When the above-described new structure is employed, it is necessary to transmit the control signal from the second amplifier to the first amplifier. In this case, if a signal line dedicated to transmission of the control signal is employed, the number of required signal lines is increased to thereby make the layout of the new structure complicated. To avoid this, a method could be devised where the signal line used to transmit the read signal amplified by the first amplifier to the second amplifier is also used to transmit the control signal from the second amplifier to the first amplifier.

However, in the new structure in which a single signal line is used to transmit both the read signal and control signal, the read signal cannot be transmitted while the control signal is being transmitted, unlike the prior structure. Accordingly, if the control signal is transmitted while the head is reading servo data that includes position information for head positioning and is dispersedly recorded on a magnetic disk, correct position information may not be read.

BRIEF SUMMARY OF THE INVENTION

The present invention has been developed in light of the above, and aims to prevent, in a disk drive apparatus, a servo data reading period from overlapping with the period in which the control signal is transmitted from the second amplifier to the first amplifier, where a single signal line is used to transmit both read and control signals, thereby preventing servo data reading errors.

To satisfy the aim, according to an aspect of the invention, there is provided a disk drive apparatus which executes positioning control to position a head to a target position on the basis of servo data read by the head from each of the servo areas dispersedly arranged on a disk medium. The disk drive apparatus comprises a first amplifier, second amplifier, signal line and transmission controller. The first amplifier amplifiers a read signal read by the head from the disk medium. The second amplifier further amplifiers the read signal amplified by the first amplifier. The signal line is used to transmit the read signal from the first amplifier to the second amplifier, and also to transmit a control signal from the second amplifier to the first amplifier, the control signal being used to control the first amplifier. The transmission controller sets a period of time in which the transmission of the control signal from the second amplifier to the first amplifier is permitted, so that it does not overlap a period of time in which the servo data is read.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a view illustrating a format on a disk 11 appearing in FIG. 1;

FIG. 2B is a view illustrating a format for a servo area provided on the disk 11;

FIG. 3 is a block diagram illustrating the control unit 24 employed in the embodiment;

FIG. 4A is a view illustrating the position of a servo area corresponding to the period of time in which the head 12 shown in FIG. 1 reads servo data;

FIG. 4B is a view showing the waveform of a transmission permission signal TP output from the transmission permission circuit 36 shown in FIG. 3;

FIG. 4C is a view illustrating the waveform of a servo mark detection signal SMD output from the SM detector (servo mark detector) 31 shown in FIG. 3;

FIG. 5 is a block diagram illustrating a control unit 24 according to a first modification of the embodiment;

FIG. 6A is a view illustrating the waveform of a servo gate signal SG generated by the SG generator (servo gate generator) 33 shown in FIG. 5;

FIG. 6B is a view illustrating the position of a servo area corresponding to the period of time in which the head 12 shown in FIG. 1 reads servo data;

FIG. 6C is a view showing the waveform of a transmission permission signal TP output from the transmission permission circuit 36 shown in FIG. 5;

FIG. 9 is a flowchart useful in explaining the execution order of processing routines including a control signal transmission routine, which are executed during servo interruption processing in a third modification of the embodiment;

FIG. 10A is a view illustrating the position of a servo area corresponding to the period of time in which the head 12 shown in FIG. 1 reads servo data;

FIG. 10B is a view illustrating the output timing of a servo sector pulse SSP generated by the SSP generator (servo sector pulse generator) 32 shown in FIG. 3; and FIG. 10C is a view illustrating an example of an execution order of processing routines including a control signal transmission routine X, which are executed during servo interruption processing based on the servo sector pulse SSP in FIG. 10B.

DETAILED DESCRIPTION OF THE INVENTION

Figure 1:
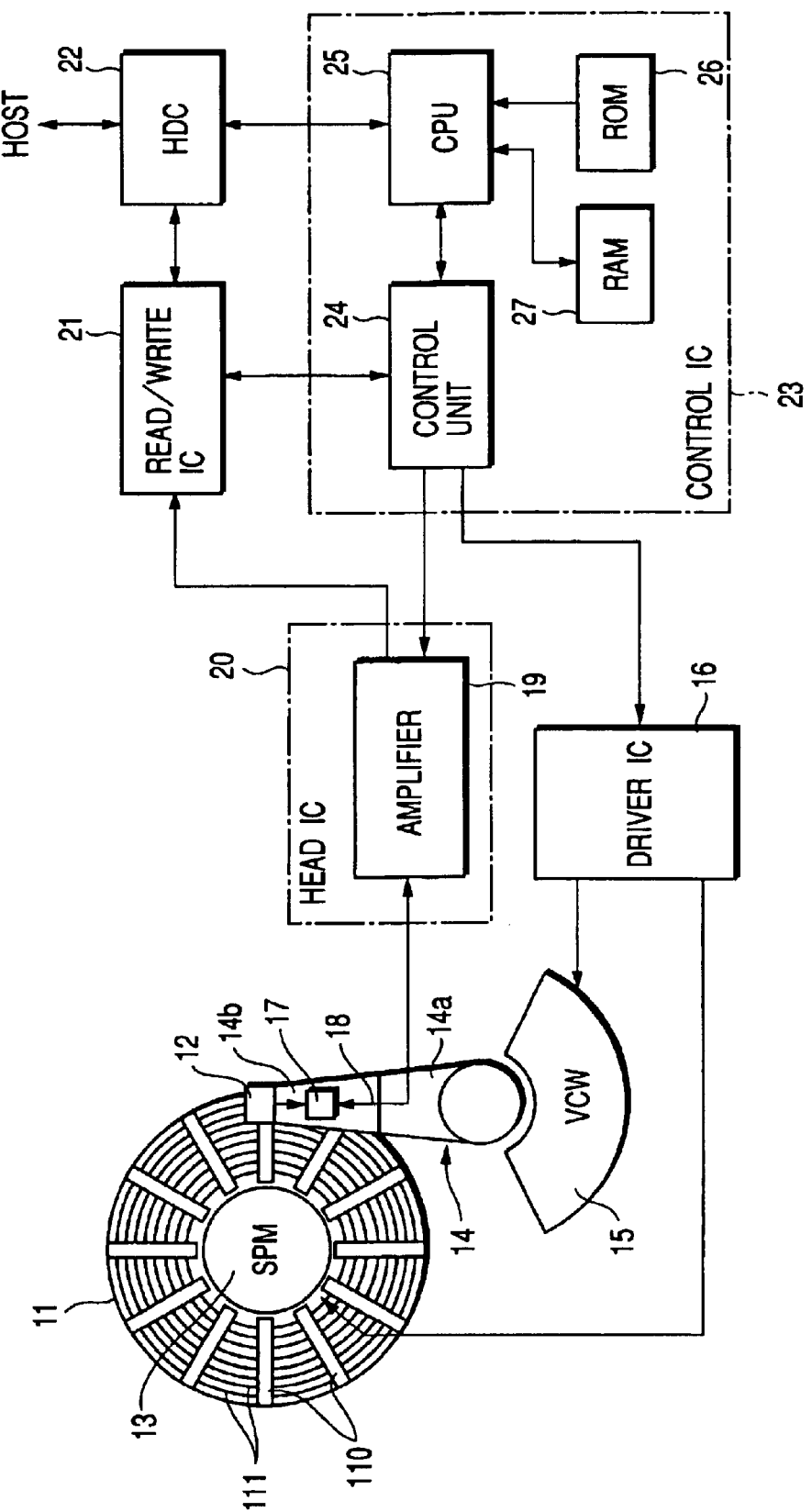
FIG. 1 is a block diagram illustrating the configuration of a hard disk drive according to an embodiment of the invention.

An embodiment in which the present invention is used in a hard disk drive will be described with reference to the accompanying drawings. FIG. 1 is a block diagram illustrating the configuration of a hard disk drive (HDD) according to the embodiment. In FIG. 1, a disk (magnetic disk medium) 11 has upper and lower surfaces. One or both of the two surfaces of the magnetic disk are used as recording surfaces on which data is recorded. Heads (magnetic heads) 12 are provided for the respective recording surfaces. Each head 12 is used to write (record) and read (reproduce) data to and from the disk 11. In the configuration of FIG. 1, although the HDD is assumed to have a single disk, it may have plural disks 11.

As shown in FIG. 2A, each recording surface of the disk 11 is circumferentially divided into a plurality of servo areas (servo sectors) 110 at regular intervals. Each servo area 110 stores servo data used for, for example, head positioning control. Each recording surface of the disk 11 also has a large number of concentric tracks 111. A user data area is interposed between each pair of adjacent servo areas 110, and has a plurality of data sectors (not shown).

As shown in FIG. 2B, each servo area 110 comprises an AGC (Automatic Gain Control) section 110a, servo mark section 110b, servo sector number section 110c, cylinder number section 110d and burst section 110e. The AGC (preamble) section 110a stores a signal of a predetermined frequency (AGC signal), which is used to stabilize the amplitude of a read signal. The servo mark section 110b stores a specific mark (servo mark) necessary to identify (the servo data recorded on) the servo area 110. The servo mark is used to generate a servo gate signal SG and servo sector pulse SSP. The servo sector number section 110c stores the servo sector number assigned to the servo area 110. The servo sector number indicates the ordinal position of the servo area 110 on the same track. The servo sector number is also used to specify the data sector numbers assigned to respective data sectors arranged in the area (user data area) between the servo area 110 and the next servo area 110 on the same track. The cylinder number section 110d stores a cylinder number (cylinder code) indicative of the position of the track (cylinder) on which the servo area 110 is located. The burst section 110e stores burst data. The burst data is a positional error signal that indicates, in the form of a waveform amplitude, a relative position of the head 12 with respect to the track (cylinder) on which the servo area 110 is located. The cylinder number and burst data are used as position information for positioning the head 12 within a target range on a target track.

Referring again to FIG. 1, the disk 11 is rotated at high speed by a spindle motor (hereinafter referred to as an "SMP") 13. The head 12 is attached to a carriage (actuator) 14 as a head movement mechanism. More specifically, the head 12 is attached to the free end of the carriage 14, i.e., the tip of a suspension 14b extending from an arm 14a incorporated in the carriage 14. The head 12 is radially moved in accordance with the swing of the carriage 14, and is positioned on a target track. The carriage 14 has a voice coil motor (hereinafter referred to as a "VCM") 15 as a driving source for the carriage 14. The carriage 14 is driven by the VCM 15. The SPM 13 and VCM 15 are driven by driving currents supplied from a driver IC (Integrated Circuit) 16. The driver IC is a motor driver in the form of an IC chip, and serves as both SPM and VCM drivers. Control variables for determining the driving current to be supplied from the driver IC 16 to the SPM 13 and VCM 15 are determined by the CPU 25.

The head 12 is connected to a first amplifier (head amplifier) 17 located near the head 12. In this embodiment, the first amplifier 17 is mounted on the suspension 14b. The first amplifier 17 is used to amplify a faint signal (read signal) read from the disk 11 by the head 12. The first amplifier 17 is connected to a second amplifier (head amplifier) 19 via a signal line 18. The second amplifier 19 is used to further amplify the read signal amplified by the first amplifier 17. In other words, the first and second amplifiers 17 and 19 are connected by cascade connection with respect to the head 12. The second amplifier 19 is included in a head IC 20. The head IC 20 is mounted on the base portion of a flexible printed circuit board (FPC) (not shown). The second amplifier 19 also has a function for transmitting, to the first amplifier 17 via the signal line 18, a control signal (described later) supplied from a control unit 24 and addressed to the first amplifier 17. A portion of the signal line 18 is provided on the suspension 14b, and the other portion of the line on the FPC. The head IC 20 contains an amplifier (write amplifier) for converting write data to a write current. The write current is supplied to the head 12.

The first and second amplifiers 17 and 19 correspond to a single read signal amplifier (head amplifier) included in the head IC of a conventional HDD. Thus, in the conventional HDD, a faint read signal read by the head is amplified to a predetermined level by the single amplifier. On the other hand, in the embodiment, a faint read signal read by the head 12 is amplified to a predetermined level in a stepwise manner, using the first and second amplifiers 17 and 19 connected by cascade connection. In this case, the first amplifier 17 can be made much smaller than the single amplifier included in the head IC of the conventional HDD. Accordingly, the first amplifier 17 can be mounted on the suspension 14b. Further, since it is sufficient if the first amplifier 17 is located near the head 12, it may be provided on the arm 14a of the carrier 14 or a stationary portion of the carrier 14.

The head IC 20 is connected to a read/write IC 21. The read/write IC 21 executes various types of signal processing. The signal processing includes the processing of A/D (Analog/Digital) converting the read signal amplified by the second amplifier 19. Further, the signal processing also includes the processing of encoding write data and decoding read data. The read/write IC 21 also has a function for detecting the servo data from a digitized read signal, and a function for transmitting the detected servo data to the control unit 24. FIG. 1 does not show the signal line related to data writing and extending from the read/write IC 21 to the head 12 via the head IC 20.

The read/write IC 21 is connected to a disk controller (hereinafter referred to as an "HDC") 22. The HDC 22 is connected to a host that uses the HDD of FIG. 1. The host is an electronic device such as a personal computer. The HDC 22 has a function for receiving a command (write command, read command, etc.) transmitted from the host, and an interface function for controlling the data transmission between the host and HDC 22 itself. The HDC 22 also has a disk control function for controlling data transmission between the disk 11 and HDC 22 itself via the read/write IC 21.

The HDC 22 is connected to the control IC 23, together with the driver IC 16, head IC 20 and read/write IC 21. The control IC 23 includes the aforementioned control unit 24 and a CPU 25, ROM (Read Only Memory) 26 and RAM (Random Access Memory) 27. The control unit 24 controls the driver IC 16, head IC 20 and read/write IC 21 in response to instructions from the CPU 25. The control unit 24 also has a function for detecting the servo mark in the servo data transmitted from the read/write IC 21, thereby generating a servo gate pulse indicative of the output time of the next servo data. The control unit 24 further includes a function for controlling the transmission of a control signal instructed by the CPU 25. The control signal, which is used to control the first amplifier 17, is the transmission control target of the control unit 24. In other words, the control unit 24 has a function for controlling the transmission timing of the control signal from the second amplifier 19 to the first amplifier 17 via the signal line 18. Specifically, the control unit 24 has a function for controlling the transmission time of the control signal so that the transmission time will not overlap with the time of reading the servo data from each servo area 110 of the disk 11. Further specifically, the control unit 24 has a function for setting the transmission permission time of the control signal to a time different from the reading time of the servo data. The control unit 24 further has a function for generating a servo sector pulse SSP upon detection of the servo mark. The servo sector pulse SSP is used as an interruption signal pulse to be output to the CPU 25 each time a servo (servo area 110) is detected. The control unit 24 has a register (not shown) for holding the servo data transmitted from the read/write IC 21. The control unit 24 is formed of, for example, an ASIC (Application Specific Integrated Circuit) such as a gate array.

The CPU 25 controls the other sections in the HDD in accordance with the control program stored in the ROM (non-volatile memory) 26 as a memory unit. The control executed by the CPU 25 includes read/write control executed using the HDC 22 in accordance with a read/write command from the host. The control executed by the CPU 25 also includes positioning control for positioning the head 12 within a target range on a target track. The positioning control is executed on the basis of position information (cylinder number and burst data) in the servo data held in a register of the control unit 24, each time the control unit 24 outputs a servo sector pulse SSP.

The operation of the HDD shown in FIG. 1 will now be described. When the head 12 is being rotated at high speed by the SPM 13, it is floating above the disk 11 at a substantially constant distance. In this state, the head 12 reads data magnetically recorded on a corresponding recording surface of the disk 11, and converts it into an electrical signal. Thus, the head 12 outputs a faint signal (read signal). The faint read signal from the head 12 is transmitted to the first amplifier 17 mounted on the suspension 14b of the carriage 14. The first amplifier 17 amplifies the read signal from the head 12 to a first level. The read signal amplified by the first amplifier 17 is transmitted to the second amplifier 19 via the signal line 18. The second amplifier 19 further amplifies the amplified read signal to a second level higher than the first level. The read signal amplified by the second amplifier 19 is transmitted to the read/write IC 21. The read/write IC 21 also receives the servo gate signal SG, which is formed of a string of servo gate pulses and generated by the control unit 24. The period in which the servo gate signal SG is high corresponds to each servo area 110 of the disk 11.

In synchronism with the servo gate signal SG from the control unit 24, the read/write IC 21 executes gain control and phase acquisition based on a signal in the AGC section 110a (AGC signal) contained in the read signal amplified by the second amplifier 19. After the gain control and phase acquisition, the read/write IC 21 digitizes subsequent signals contained in the read signal amplified by the second amplifier 19. Further, the read/write IC 21 sequentially detects, from the digitized signals, data contained in the servo mark section 10b, servo sector number section 110c, cylinder number section 110d and burst section 110e. Thus, the read/write IC 21 sequentially detects the servo mark (SM), servo sector number, cylinder number and burst data. The read/write IC 21 transmits, to the control unit 24 by, for example, serial transmission, the servo data comprising the detected servo mark, servo sector number, cylinder number and burst data.

The control unit 24 detects the servo mark from the servo data transmitted from the read/write IC 21, and generates the servo gate pulse indicative of the output time of the next servo data, in accordance with the detection of the servo mark. The servo data is held in the register in the control unit 24 until the next servo data is transmitted. The control unit 24 generates a servo sector pulse SSP a first predetermined period of time after the detection of the servo mark. The control unit 24 generates a dummy servo sector pulse SSP when a second predetermined period of time elapses, if the next servo mark is not detected within the second predetermined time period. The second predetermined period starts upon the detection of the servo mark. The servo sector pulse SSP is input to the CPU 25 as an interruption signal (servo interruption signal). Each time the servo sector pulse SSP is input from the control unit 24, the CPU 25 starts interruption processing (servo interruption processing). This servo interruption processing includes positioning control for positioning the head 12 within a target range on a target track on the basis of the position information (cylinder number and burst data) contained in the servo data held in the register in the control unit 24.

On the other hand, the control signal for controlling the first amplifier 17 is transmitted from the control unit 24 to the first amplifier 17 via the second amplifier 19 in the head IC 20. In this embodiment, the signal line 18 is used both to transmit the read signal, supplied from the head 12, from the first amplifier 17 to the second amplifier 19, and to transmit the control signal from the second amplifier 19 to the first amplifier 17. Accordingly, in the embodiment, the number of lines necessary for signal transmission can be reduced and hence the layout of the signal lines can be simplified, as compared to the case where the transmission of the read signal from the first amplifier 17 to the second amplifier 19 and that of the control signal from the second amplifier 19 to the first amplifier 17 are executed using respective dedicated signal lines.

In the embodiment, however, during the time period in which the control signal is transmitted from the second amplifier 19 to the first amplifier 17, for example, the read signal from the head 12 cannot be transmitted from the first amplifier 17 to the second amplifier 19. If the control signal is transmitted while the head 12 is reading servo data, the control unit 24 cannot normally acquire the data necessary for head positioning.

The embodiment employs a mechanism for preventing such a problem. Specifically, in the embodiment, when the CPU 25 has instructed the control unit 24 to transmit the control signal to the first amplifier 17, the transmission of the control signal to the first amplifier 17 is permitted only within a predetermined period of time, which does not overlap with the time period in which the head 12 reads servo data.

Referring now to the configuration view of FIG. 3 and the timing charts of FIGS. 4A–4C, a description will be given of a specific example of permission control of control signal transmission, executed by the control unit 24. FIG. 3 is a block diagram illustrating a configuration example of the control unit 24 that is related to the invention. The control unit 24 comprises a transmission controller 30, servo mark detector (hereinafter referred to as an "SM detector") 31, servo sector pulse generator (hereinafter referred to as an "SSP generator") 32 and servo gate generator (hereinafter referred to as an "SG generator") 33. The SM detector 31 detects the servo mark from the servo data transmitted from the read/write IC 21. Further, the SM detector 31 outputs a servo mark detection signal SMD that assumes a high level (logic "1") only for a predetermined period of time from a servo mark detection time t1, as is shown in FIG. 4C. In other words, each time the SM detector 31 detects the servo mark in the servo data, it outputs a servo mark detection pulse 41. The output time of the servo mark detection pulse 41 corresponds to the position of the servo area 110 shown in FIG. 4A. The SSP generator 32 generates a servo sector pulse SSP in accordance with the leading edge of the servo mark detection signal SMD generated by the SM detector 31. The SG generator 33 sets the servo gate signal SG to high during a time period corresponding to the next servo area 110, in accordance with the leading edge of the servo mark detection signal SMD generated by the SM detector 31. In other words, the SG generator 33 generates a servo gate pulse at a time corresponding to the next servo area 110, in accordance with the leading edge of the servo mark detection signal SMD.

The transmission controller 30 comprises a counter 34, T1 detector 35, transmission permission circuit 36 and T2 detector 37. The counter 34 assumes a count enable state when the servo mark detection signal SMD from the SM detector 31 is high. In other words, each time a servo mark detection pulse is output from the SM detector 31, the counter 34 assumes a count enable state. During the count enable state, the counter 34 executes counting in synchronism with an internal clock CLK of a predetermined frequency.

The T1 detector 35 contains a comparator (not shown). The T1 detector 35 compares the count value of the counter 34 with a preset value (time parameter) T1, using the comparator. If the count value of the counter 34 is equal to T1, i.e., if a time period T1, which starts upon the detection of a servo mark by the SM detector 31, elapses, the T1 detector 35 outputs a T1 detection signal 301 of high level. The transmission permission circuit 36 outputs a transmission permission signal TP of high level (logic "1") in accordance with the T1 detection signal 301 from the T1 detector 35. Specifically, the transmission permission circuit 36 sets the transmission permission signal TP to high when the time period T1, which starts at the servo mark detection time t1, elapses, as is shown in FIGS. 4B and 4C. As a result, the transmission of the control signal to the first amplifier 17 is permitted.

Similarly, the T2 detector 37 contains a comparator (not shown). The T2 detector 37 compares the count value of the counter 34 with a preset value (time parameter) T2 (T2>T1), using the comparator. If the count value of the counter 34 is equal to T2, i.e., if a time period T2 that starts upon the detection of a servo mark by the SM detector 31 elapses, the T2 detector 37 outputs a T2 detection signal 302 of high level. The transmission permission circuit 36 returns the transmission permission signal TP to low (logic "0") in accordance with the T2 detection signal 302 from the T2 detector 37. Specifically, the transmission permission circuit 36 returns the transmission permission signal TP to low when the time period T2, which starts upon the servo mark detection time t1, elapses, as is shown in FIGS. 4B and 4C. Further, in response to the T2 detection signal 302 from the T2 detector 37, the counter 34 is cleared.

In the embodiment, during the time when the transmission permission signal TP is high, i.e., a time period of (T2−T1), the transmission of the control signal from the second amplifier 19 to the first amplifier 17 is permitted. The time period of (T2−T1) ranges from the end of the time period T1 to the end of the time period T2 (T1 starts at t1 when the SM detector 31 detects a servo mark, and T2 also starts at t1). Thus, if the CPU 25 instructs, when the transmission permission signal TP is high, the control unit 24 to transmit the control signal to the first amplifier 17, the control unit 24 outputs the control signal to the second amplifier 19 (by, for example, serial output). The control signal output to the second amplifier 19 is then transmitted to the first amplifier 17 via the signal line 18. On the other hand, if the CPU 25 instructs, when the transmission permission signal TP is low, the control unit 24 to transmit the control signal to the first amplifier 17, the control unit 24 interrupts (waits for) the transmission of the control signal until the transmission permission signal TP becomes high.

As described above, in the embodiment, the time parameters T1 and T2 for determining the time period in which the control signal can be transmitted to the first amplifier 17 are preset. Further, in the embodiment, the counter 34 starts the measurement of time when the SM detector 31 detects a servo mark. A transmission permission signal TP of high level is output for the time period ranging from the measurement end of the time period T1 to the measurement end of the time period T2. Only during the time period in which the transmission permission signal TP is high, the transmission of the control signal to the first amplifier 17 is permitted. T1 and T2 are set so that the time period determined by T1 and T2, in which the transmission of the control signal is permitted, will not overlap the time period in which the head 12 reads the servo data from each servo area 110 on the disk 11. As a result, the transmission of the control signal from the second amplifier 19 to the first amplifier 17 is prevented during the reading of the servo data. In other words, in the embodiment, the transmission of the control signal from the second amplifier 19 to the first amplifier 17 is executed during the time period in which no servo data is read. Thus, in the embodiment, although the signal line 18 connecting the first amplifier 17 to the second amplifier 19 is used for the transmission of both the read signal and control signal, the problem that the control unit 24 cannot normally fetch the servo data necessary for the positioning of the head 12 because of the transmission of the control signal can be avoided.

[First Modification]

Referring then to the configuration view of FIG. 5 and the timing charts of FIGS. 6A–6C, a first modification of the embodiment will be described. The first modification differs from the embodiment in the mechanism of the permission control of the control signal transmission executed by the control unit 24. Accordingly, the control unit 24 employed in the first modification has a different configuration from that of the control unit 24 of FIG. 3 employed in the embodiment. FIG. 5 shows the configuration of the control unit 24 employed in the first modification. In FIGS. 3 and 5, like reference numerals denote like elements.

As shown in FIG. 5, the control unit 24 employed in the first modification comprises an SM detector 31, SSP generator 32, SG generator 33 and transmission controller 50 corresponding to the transmission controller 30 in FIG. 3. The transmission controller 50 comprises a counter 54, transmission permission circuit 56 and T2$a$ detector 57. The counter 54 assumes a count enable state when the servo gate signal SG output from the SG generator 33 shifts from high to low. During the count enable state, the counter 54 executes counting in synchronism with an internal clock CLK. As shown in FIGS. 6A and 6B, the servo gate signal SG shifts from low to high at a point in time corresponding to the front edge of each servo area 110, and shifts from high to low at a point in time corresponding to the rear end of each servo area 110. Accordingly, the counter 54 starts the measurement of time in synchronism with the trailing edge of the servo gate signal SG corresponding to the rear end of each servo area 110, i.e., the trailing edge of each servo gate pulse.

As shown in FIGS. 6A and 6C, the transmission permission circuit 56 outputs a transmission permission signal TP of high level in synchronism with the trailing edge of the servo gate signal SG, thereby permitting the transmission of the control signal to the first amplifier 17. The T2$a$ detector 57 contains a comparator (not shown), and compares the count value of the counter 54 with a preset value (time parameter) T2$a$, using the comparator. If the count value of the counter 54 is equal to T2$a$, i.e., if a time period T2$a$, which starts at the trailing edge of the servo gate signal SG, elapses, the T2$a$ detector 57 outputs a T2$a$ detection signal 501 of high level. The transmission permission circuit 56 returns the transmission permission signal TP to low in synchronism with the output of the T2$a$ detection signal 501 of high level from the T2$a$ detector 57. More specifically, the transmission permission circuit 56 returns the transmission permission signal TP of high level to low when a time period T2, which starts at the trailing edge of the servo gate signal SG (t2), elapses, as is shown in FIGS. 6A–6C. As a result, the transmission of the control signal to the first amplifier 17 is inhibited. In response to the T2$a$ detection signal 501 of high level from the T2$a$ detector 57, the counter 54 is cleared.

As described above, in the first modification of the embodiment, the transmission of the control signal is permitted in synchronism with the trailing edge of the servo gate signal SG, and is inhibited when the counter 54 has measured the time period T2$a$ from the trailing edge of the servo gate signal SG. T2$a$ is set so that the time period determined by the trailing edge of the servo gate signal SG and T2$a$, in which the transmission of the control signal is permitted, will not overlap the time period in which the head 12 reads the servo data from each servo area 110 on the disk 11. As is apparent from the above, also in the first modification, the transmission of the control signal from the second amplifier 19 to the first amplifier 17 is prevented during the reading of the servo data. Moreover, since the trailing edge of the servo gate signal SG is used as the start point of the permission of the control signal, a detector corresponding to the T1 detector 35 in FIG. 3 is not necessary.

[Second Modification]

Figure 7:
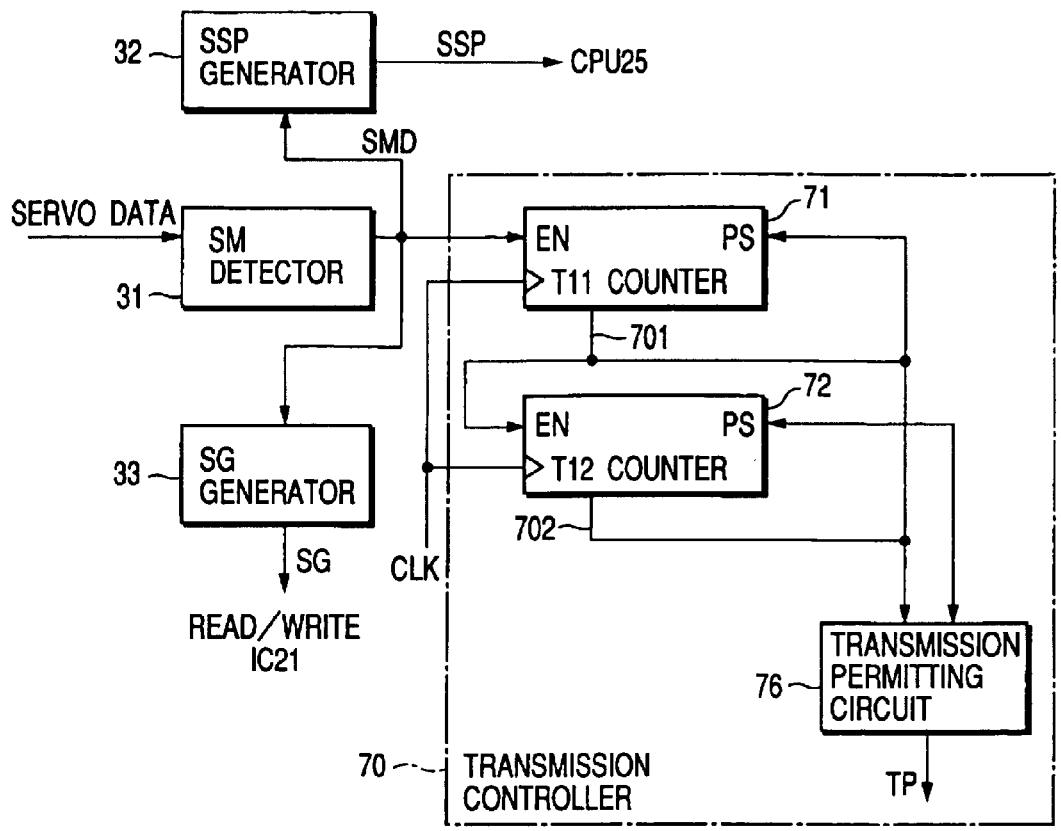
FIG. 7 is a block diagram illustrating a control unit 24 according to a second modification of the embodiment.
Figure 8A:
FIG. 8A is a view illustrating the waveform of a servo gate signal SG generated by the SG generator (servo gate generator) 33 shown in FIG. 7.
Figure 8B:
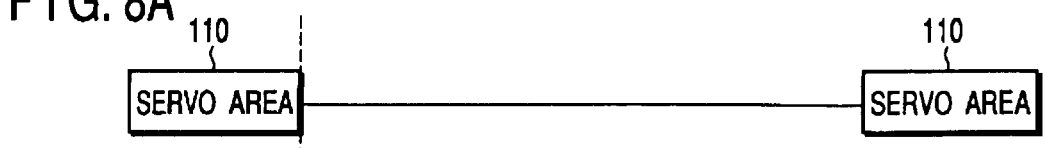
FIG. 8B is a view illustrating the position of a servo area corresponding to the period of time in which the head 12 shown in FIG. 1 reads servo data.
Figure 8C:
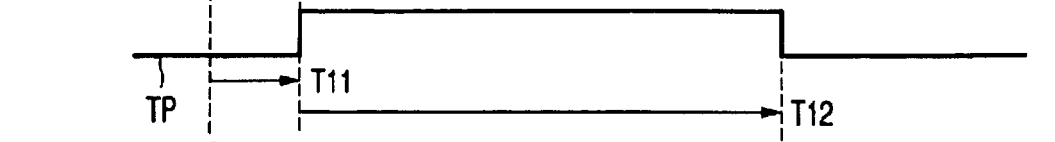
FIG. 8C is a view showing the waveform of a transmission permission signal TP output from the transmission permission circuit 76 shown in FIG. 7.

Referring to the configuration view of FIG. 7 and the timing charts of FIGS. 8A–8C, a second modification of the embodiment will be described. The second modification also differs from the embodiment in the mechanism of the permission control of the control signal transmission executed by the control unit 24. FIG. 7 shows the configuration of the control unit 24 employed in the second modification. In FIGS. 3 and 7, like reference numerals denote like elements.

As shown in FIG. 7, the control unit 24 employed in the second modification comprises an SM detector 31, SSP generator 32, SG generator 33 and transmission controller 70 corresponding to the transmission controller 30 in FIG. 3. The transmission controller 70 comprises a T11 counter 71, T12 counter 72 and transmission permission circuit 76. The T11 counter 71 assumes a count enable state when the servo mark detection signal SMD output from the SM detector 31 is high. In other words, the T11 counter 71 assumes a count enable state when the SM detector 31 has detected a servo mark and output a servo mark detection pulse. In this state, the T11 counter 71 starts a backward counting from a preset value (time parameter) T11. When the T11 counter 71 has finished the backward counting from the preset value T11, the T11 counter 71 outputs a T11 count signal 701 of high level for a predetermined period of time. The transmission permission circuit 76 sets the transmission permission signal TP to high in synchronism with the output of the T11 count signal 701. More specifically, as shown in FIGS. 8B and 8C, the transmission permission circuit 76 sets the transmission permission signal TP to high when a time period T11 elapses, T11 starting at t3 at which the SM detector 31 detects a servo mark. At this time, the value T11 is set on the T11 counter 71. That is, T11 is automatically set on the T11 counter 71 when the T11 counter 71 has output the T11 count signal 701 of high level.

On the other hand, the T12 counter 72 assumes a count enable state when the T11 counter 71 has output the T11 count signal 701. In this state, the T12 counter 72 starts a backward counting from a preset value (time parameter) T12. When the T12 counter 72 has finished the backward counting from the preset value T12, the T12 counter 72 outputs a T12 count signal 702 of high level for a predetermined period of time. The transmission permission circuit 76 returns the transmission permission signal TP to low in synchronism with the output of the T12 count signal 702. In other words, as shown in FIGS. 8B and 8C, the transmission permission circuit 76 returns the transmission permission signal TP to low when a time period (T11+T12) elapses, (T11+T12) starting at t3 at which the SM detector 31 detects a servo mark. At this time, the value T12 is set on the T12 counter 72. That is, T12 is automatically set on the T12 counter 72 when the T12 counter 72 has output the T12 count signal 702 of high level.

Thus, in the second modification of the embodiment, when the T11 counter 71 has measured the time period T11 that starts upon the detection of a servo mark by the SM detector 31, the transmission of the control signal is permitted. Further, when the T12 counter 72 has measured the time period T12 that starts at the end of the time period T11, the transmission of the control signal is inhibited. T11 and T12 are set so that the time period determined by T11 and T12, in which the transmission of the control signal is permitted, will not overlap the time period in which the head 12 reads the servo data from each servo area 110 on the disk 11. As is apparent from the above, also in the second modification, the transmission of the control signal from the second amplifier 19 to the first amplifier 17 is prevented during the reading of the servo data. Moreover, since the counters 71 and 72 for measuring the time periods T11 and T12, detectors corresponding to the detectors 35 and 37 in FIG. 3 are not necessary, although one more counter is required as compared to the configuration of FIG. 3. Instead of the T12 counter 72, a counter may be used which assumes a count enable state when the SM detector 31 has detected a servo mark, and measures the time period (T11+T12).

[Third Modification]

In the embodiment and first and second modifications, the control unit 24 executes permission control of control signal transmission. On the other hand, the third modification is characterized in that the permission control is realized by a servo interruption program stored in the ROM 26, more specifically, by processing routines included in the program. Referring to the flowchart of FIG. 9 and the timing charts of FIGS. 10A–10C, the third modification will be described. As aforementioned, the control unit 24 shown in FIG. 1 comprises, for example, the SM detector 31, SSP generator 32 and SG generator 33 shown in FIG. 3. The CPU 25 starts, as in the above-described embodiment, interruption processing (servo interruption processing) when it has received a servo sector pulse SSP output from the SSP generator 32 of the control unit 24. The servo sector pulse SSP is generated in accordance with the servo mark detection signal SMD from the SM detector 31. Accordingly, it can be said that the servo interruption processing is executed in accordance with the detection of the servo mark by the SM detector 31. The servo interruption processing includes head positioning control processing based on the position information in the servo data, and transmission processing of the control signal for controlling the first and second amplifiers 17 and 19, etc.

In this modification, it is assumed that the program executed in the servo interruption processing, i.e., the program for servo processing, is formed of a processing routine (A) 91, processing routine (B) 92, control signal transmission routine (X) 93 and processing routine (C) 94, as is shown in the flowchart of FIG. 9. The control signal transmission routine (X) 93 controls the transmission of the control signal. For facilitating the description, it is assumed that the output timing of the servo sector pulse SSP is identical to the detection timing of the servo mark by the SM detector 31. Generally, the output time of the servo sector pulse SSP is between the detection time of the servo mark and the trailing edge of the servo gate signal SG. Further, assume that the processing time periods of the processing routine (A) 91, processing routine (B) 92, control signal transmission routine (X) 93 are TA, TB and TX, respectively, and also assume that T1<TA+TB and TA+TB+TX<T2, i.e., T1<TA+TB<T2−TX. T1 and T2 are the values (time parameters) defined in the above-described embodiment.

In the third modification, the servo processing program is allocated on the ROM 26 so that the processing routine (A) 91, processing routine (B) 92, control signal transmission routine (X) 93 and processing routine (C) 94 are carried out in this order, as is shown in the flowchart of FIG. 9. As is evident from FIGS. 10A–10C, the period in which the control signal transmission routine (X) 93 is carried out is between the time periods T1 and T2 and does not overlap with the servo data reading period. Thus, in the third modification, the period in which the control signal is transmitted to the first amplifier 17 is set such that it does not overlap with the servo data reading period, simply by devising the order of the processing routines of the program for servo interruption processing, in particular, the ordinal position of the control signal transmission routine 93.

In the first to third modifications of the embodiment, the invention is directed to an HDD (hard disk drive). However, the invention can also be directed to a disk drive apparatus, other than HDDs, such as a magneto-optical drive. It is sufficient if the disk drive apparatus executes positioning control for positioning a head to a target position on the basis of servo data read by the head from each of the servo areas dispersedly arranged on a disk medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive apparatus which executes positioning control to position a head to a target position on the basis of servo data read by the head from servo areas discretely arranged on a disk medium, comprising:
   a first amplifier which amplifies a read signal read by the head from the disk medium;
   a second amplifier which further amplifies the read signal amplified by the first amplifier;
   a single signal line used to transmit the read signal from the first amplifier to the second amplifier, and also to transmit a control signal from the second amplifier to the first amplifier, the control signal being used to control the first amplifier; and
   a transmission controller configured to permit the control signal to be transmitted from the second amplifier to the first amplifier via the single signal line during a period of time different from a period of time in which the servo data is read.

2. The disk drive apparatus according to claim 1, wherein:
   the servo data contains a servo mark used to identify the servo data; and
   the transmission controller sets a period or time in which a transmission of the control signal is permitted, based on a position of the servo mark.

3. The disk drive apparatus according to claim 2, further comprising:
   a servo mark detector which detects the servo mark in the servo data,
   wherein the transmission controller comprises
   a counter which begins measuring time synchronously with detection of the servo mark by the servo mark detector,
   a first timing detector configured to detect whether the counter has measured time until a first predetermined point in time after the servo data containing the servo mark detected by the servo mark detector is read,
   a second timing detector configured to detect whether the counter has measured time from the first predetermined point in time to a second predetermined point in time before a point in time at which reading of next servo data is started, and
   a transmission permission circuit configured to start transmission of the control signal at the first predetermined point in time and end transmission of the control signal at the second predetermined point in time.

4. The disk drive apparatus according to claim 3, wherein the counter is cleared when the second timing detector has detected that the counter has measured time until the second predetermined point in time.

5. The disk drive apparatus according to claim 2, further comprising:
   a servo mark detector which detects the servo mark in the servo data; and
   a servo gate generator which generates a servo gate pulse in accordance with detection of the servo mark by the servo mark detector, the servo gate pulse indicating a point in time at which next servo data is detected,
   wherein the transmission controller comprises
   a counter which starts measuring time synchronously with a trailing edge of the servo gate pulse generated by the servo gate generator,
   a timing detector configured to detect whether the counter has measured time from the trailing edge of the servo gate pulse to a predetermined point in time before reading of next servo data is started, and
   a transmission permission circuit configured to start transmission of the control signal synchronously with the trailing edge of the servo gate pulse and end transmission of the control signal at the predetermined point in time.

6. The disk drive apparatus according to claim 5, wherein the counter is cleared when the timing detector has detected that the counter has measured time from the trailing edge of the servo gate pulse to the predetermined point in time.

7. The disk drive apparatus according to claim 2, further comprising:
   a servo mark detector which detects the servo mark in the servo data,
   wherein the transmission controller comprises
   a first counter which measures, on the basis of a first time parameter, a first period of time ranging from a point in time where the servo mark detector detects the servo mark to a first predetermined point in time where the servo mark detector finishes reading the servo data containing the servo mark,
   a second counter which measures, on the basis of a second time parameter, a second period of time ranging from a point in time where the first counter finishes reading the servo data containing the servo mark to a second predetermined point in time where reading of next servo data is started, and
   a transmission permission circuit configured to start transmission of the control signal at the point in time the first counter finishes measuring the first period of time, and to end transmission at the point in time where the second counter finishes measuring time.

8. The disk drive apparatus according to claim 7, wherein:
   the first time parameter is automatically set on the first counter each time the first counter measures the first period of time; and
   the second time parameter is automatically set on the second counter each time the second counter measures the second period of time.

9. The disk drive apparatus according to claim 2, further comprising:
   a servo mark detector which detects the servo mark in the servo data,
   wherein the transmission controller comprises
   a first counter which measures time from a point in time at which the servo mark detector detects the servo mark to a first predetermined point in time after finishing reading of the servo data containing the servo mark;
   a second counter which measures time from the point in time at which the servo mark detector detects the servo mark to a second predetermined point in time before reading of next servo data begins, the second predetermined point in time being later than the first predetermined point in time, and
   a transmission permission circuit configured to start transmission of the control signal at a point in time at which time measurement of the first counter finishes, and also to set an end time at which a period of time in which the to end transmission of the control signal at a point in time at which time measurement of the second counter finishes.

10. The disk drive apparatus according to claim 1, wherein the first amplifier is located closer to the head than the second amplifier.

11. The disk drive apparatus which executes positioning control to position a head to a target position on the basis of servo data read by the head from servo areas discretely arranged on a disk medium, comprising:
- a first amplifier which amplifies a read signal read by the head from the disk medium;
- a second amplifier which further amplifies the read signal amplified by the first amplifier;
- a single signal line used to transmit the read signal from the first amplifier to the second amplifier, and also to transmit a control signal from the second amplifier to the first amplifier, the control signal being used to control the first amplifier;
- a servo mark detector which detects a servo mark in the servo data;
- a CPU which executes an interruption processing program in accordance with detection of the servo mark by the servo mark detector, the program comprising a plurality of processing routines which include a control signal transmission routine to transmit the control signal via the single signal line; and
- a storage unit configured to store programs, which include the interruption processing program executed by the CPU, wherein the control signal transmission routine being in an ordinal position in which the control signal transmission routine is executed within a period of time different from a period of time in which the servo data is read.

12. The disk drive apparatus according to claim 11, wherein the first amplifier is located closer to the head than the second amplifier.

13. A method of using a single signal line to transmit both a read signal and a control signal, for use in a disk drive apparatus which executes positioning control to position a head to a target position on the basis of servo data read by the head from each of servo areas discretely arranged on a disk medium, comprising:

transmitting the control signal from a second amplifier to a first amplifier via the single signal line, the control signal being used to control the first amplifier, the signal line being also used to transmit the read signal, read by the head from the disk medium, from the first amplifier which amplifies the read signal, to the second amplifier which further amplifies the read signal amplified by the first amplifier; and permitting transmission of the control signal from the second amplifier to the first amplifier only within a period of time different from a period of time in which the servo data is read.

14. The method according to claim 13, further comprising:

detecting, from the servo data, a servo mark to identify the servo data, wherein the permitting includes setting a period of time in which the transmission of the control signal is permitted, on the basis of a point in time at which the servo mark is detected.

* * * * *